US 9,239,700 B2

(12) United States Patent
Ullrich et al.

(10) Patent No.: US 9,239,700 B2
(45) Date of Patent: Jan. 19, 2016

(54) SYSTEM AND METHOD FOR AUTOMATICALLY PRODUCING HAPTIC EVENTS FROM A DIGITAL AUDIO SIGNAL

(71) Applicant: Immersion Corporation, San Jose, CA (US)

(72) Inventors: Christopher J. Ullrich, Ventura, CA (US); Stephen D. Rank, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 320 days.

(21) Appl. No.: 13/743,540

(22) Filed: Jan. 17, 2013

(65) Prior Publication Data

US 2013/0131851 A1 May 23, 2013

Related U.S. Application Data

(63) Continuation of application No. 11/515,243, filed on Aug. 31, 2006, now Pat. No. 8,378,964.

(60) Provisional application No. 60/792,137, filed on Apr. 13, 2006.

(51) Int. Cl.
*G06F 17/00* (2006.01)
*G06F 3/16* (2006.01)
*G08B 6/00* (2006.01)

(52) U.S. Cl.
CPC ... *G06F 3/16* (2013.01); *G08B 6/00* (2013.01)

(58) Field of Classification Search
CPC ... G10H 2220/311; G06F 3/016; G10L 21/06
See application file for complete search history.

(56) References Cited

U.S. PATENT DOCUMENTS

| 4,334,280 A | 6/1982 | McDonald |
| 4,355,348 A | 10/1982 | Williams |
| 4,768,412 A | 9/1988 | Sanderson |
| 5,388,992 A | 2/1995 | Franklin et al. |
| 5,437,608 A | 8/1995 | Cutler |
| 5,438,529 A | 8/1995 | Rosenberg et al. |

(Continued)

FOREIGN PATENT DOCUMENTS

| CN | 1620327 A | 5/2005 |
| CN | 101421707 A | 4/2009 |

(Continued)

OTHER PUBLICATIONS

Gillespie, Brent, "The Virtual Piano Action: Design and Implementation," Center for Computer Research in Music and Acoustics, 1994, 4 pages.

(Continued)

*Primary Examiner* — Joseph Saunders, Jr.
(74) *Attorney, Agent, or Firm* — Miles & Stockbridge P.C.

(57) ABSTRACT

In an embodiment, a system and method for automatically converting a plurality of events in a plurality of channels in a structured representation sequence into haptic events. The method comprises calculating an event score for each event of the sequence in one or more channels. The method also comprises calculating a cumulative score based on the event scores in the one or more channels. The method includes selectively designating haptic events to the events based on the event scores in one or more selected channels, wherein the haptic events are output by a haptic actuator.

20 Claims, 13 Drawing Sheets

(56) References Cited

U.S. PATENT DOCUMENTS

| | | | |
|---|---|---|---|
| 5,532,936 | A | 7/1996 | Perry |
| 5,669,818 | A | 9/1997 | Thorner et al. |
| 5,684,722 | A | 11/1997 | Thorner et al. |
| 5,816,823 | A | 10/1998 | Naimark et al. |
| 5,842,162 | A | 11/1998 | Fineberg |
| 6,140,568 | A | 10/2000 | Kohler |
| 6,160,489 | A | 12/2000 | Perry et al. |
| 6,191,349 | B1 | 2/2001 | Flam |
| 6,285,351 | B1 | 9/2001 | Chang et al. |
| 6,292,776 | B1 | 9/2001 | Chengalvarayan |
| 6,496,115 | B2 | 12/2002 | Arakawa |
| 6,703,550 | B2 | 3/2004 | Chu |
| 6,885,876 | B2 | 4/2005 | Aaltonen et al. |
| 6,963,762 | B2 | 11/2005 | Kaaresoja et al. |
| 7,623,114 | B2 | 11/2009 | Rank |
| 2002/0178012 | A1 | 11/2002 | Wang et al. |
| 2003/0067440 | A1 | 4/2003 | Rank |
| 2004/0161118 | A1 | 8/2004 | Chu |
| 2004/0164971 | A1 | 8/2004 | Hayward et al. |
| 2004/0172240 | A1 | 9/2004 | Crockett et al. |
| 2004/0237758 | A1 | 12/2004 | Bruti et al. |
| 2005/0149339 | A1 | 7/2005 | Tanaka et al. |
| 2005/0190199 | A1 | 9/2005 | Brown et al. |
| 2006/0129719 | A1 | 6/2006 | Cruz-Hernandez et al. |
| 2010/0066512 | A1 | 3/2010 | Rank |
| 2011/0191674 | A1 | 8/2011 | Rawley et al. |

FOREIGN PATENT DOCUMENTS

| | | |
|---|---|---|
| EP | 1411424 A2 | 4/2004 |
| JP | 11038865 A | 2/1992 |
| JP | 10506508 H | 6/1998 |
| JP | 2004528599 A | 9/2004 |
| JP | 2005506613 A | 3/2005 |
| JP | 2005506614 | 3/2005 |
| WO | 9917850 A2 | 4/1999 |
| WO | 03032289 | 4/2003 |
| WO | 2007120765 A2 | 10/2007 |

OTHER PUBLICATIONS

Kirman, Jacob H., "Tactile Perception of Computer-Derived Formant Patterns From Voiced Speech," J. Acoust. Soc. Am., vol. 55, No. 1, Jan. 1974, pp. 163-169.

"VibeTonz System", Immersion Corporation, 2004, p. 1-6.

"VibeTonz Mobile Player", Immersion Corporation, 2005, 4 pages.

VibeTonz Solution for BREW Developers, Immersion Corporation, 2005, 2 pages.

VibeTonz Studio SDK, Immersion Corporation, 2005, 4 pages.

Reed, Charlotte M. et al., "Research on Tactile Communication of Speech: A Review," ASHA Monographs, No. 20, 1982, pp. 1-23.

Official Communication issued in the corresponding CN Application No. 200780013161.2, dated Feb. 22, 2011.

SYSTEM AND METHOD FOR AUTOMATICALLY PRODUCING HAPTIC EVENTS FROM A DIGITAL AUDIO SIGNAL

RELATED APPLICATION

This application is a continuation application of U.S. Pat. No. 8,378,964, issued on Feb. 19, 2013 (herein incorporated by reference), which claims the benefit of priority based on U.S. Provisional Patent Application Ser. No. 60/792,137, filed on Apr. 13, 2006 (herein incorporated by reference), in the name of inventors Stephen D. Rank and Christopher J. Ullrich, entitled "Music to Haptic Code Conversion," commonly owned herewith.

FIELD

The subject matter described herein relates generally to the field of haptics, and more particularly to generating a haptic effect control signal or haptic track corresponding to a digital audio or audio/visual file.

BACKGROUND

Tactile vibrations are often desirable in a user interface device. Touch unifies the spatial senses; those you use to navigate your way through the world—sight, sound, and touch. Touch produces reflex-rate response in milliseconds (ms) and supplies a completeness that sight and sound together can't replace.

In a user interface device, it is useful to have tactile vibrations match sound such as when a music file is played on a cell phone. Audio for end-user devices may be encoded in two basic ways: in a structured representational format, such as a protocol which symbolically encodes the sounds to be played into a string of known symbols (e.g. Musical Instrument Digital Interface or "MIDI"); and as digital sampled audio, which is a set of periodic samples of the audio waveform.

Currently, sampled audio files can be converted through manual conversion. A human designer listens, analyzes, and judges the sampled audio file and selects features of the sampled audio from which to create haptic effects. However, human design intervention is a constrained resource.

What is needed is a fully-automated or semi-automated method of converting music files into haptic effects.

SUMMARY

In an embodiment, a method for automatically converting a plurality of events in a plurality of channels in a structured representation sequence into haptic events. The method comprises calculating an event score for each event of the sequence in one or more channels. The method also comprises calculating a cumulative score based on the event scores in the one or more channels. The method includes selectively designating haptic events to the events based on the event scores in one or more selected channels, wherein the haptic events are output by a haptic actuator.

In an embodiment, a method for automatically generating haptic effects comprises receiving a representationally structured file containing audio. The method includes assigning a score for each of a plurality of designated audio events in one or more channels of the representationally structured file. The method comprises generating a plurality of haptic events by assigning a haptic effect to each of the designated audio events satisfying a score criteria. The method also comprises outputting the haptic events to an actuator, wherein each outputted haptic event is associated with a corresponding audio event in the representationally structured file.

In an embodiment, a program storage device readable by a machine, embodying a program of instructions which are executable by the machine to perform a method for automatically generating haptic effects. The method receiving a representationally structured file containing audio. The method includes assigning a score for each of a plurality of designated audio events in one or more channels of the representationally structured file. The method comprises generating a plurality of haptic events by assigning a haptic effect to each of the designated audio events satisfying a score criteria. The method also comprises outputting the haptic events to an actuator, wherein each outputted haptic event is associated with a corresponding audio event in the representationally structured file.

In one or more of the embodiments described, the one or more channels are selected based on the cumulative score of events therein. The method further comprises determining whether an event begins within a threshold time of an adjacent event in a same channel and choosing the event having a higher frequency when the events are within the threshold time, wherein the chosen event is scored. In an embodiment, the method further comprises comparing the events between two or more channels along a common timeline and choosing the events in one of the two or more channels which is not within a threshold correlation between the two or more channels, wherein the chosen events are scored.

In an embodiment, the event score is calculated based on a difference between a frequency of a current event and a frequency of a previous event. In an embodiment, the event score is calculated based on a difference in start times between an event and a previous event. In an embodiment, the event score is calculated based upon a duration and/or magnitude value of the event. In an embodiment, the event score is calculated based upon a change in duration between a particular event and an adjacent event, wherein the adjacent event is previous or subsequent to the particular event in the timeline. In an embodiment, the method further comprises adjusting a duration of the haptic event to be greater than a minimum time duration and less than a maximum time duration. In an embodiment, the event score is weighted based an instrument playing the event in the channel. In an embodiment, the method further comprises identifying a particular channel as including at least one of melodic events and percussive events.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
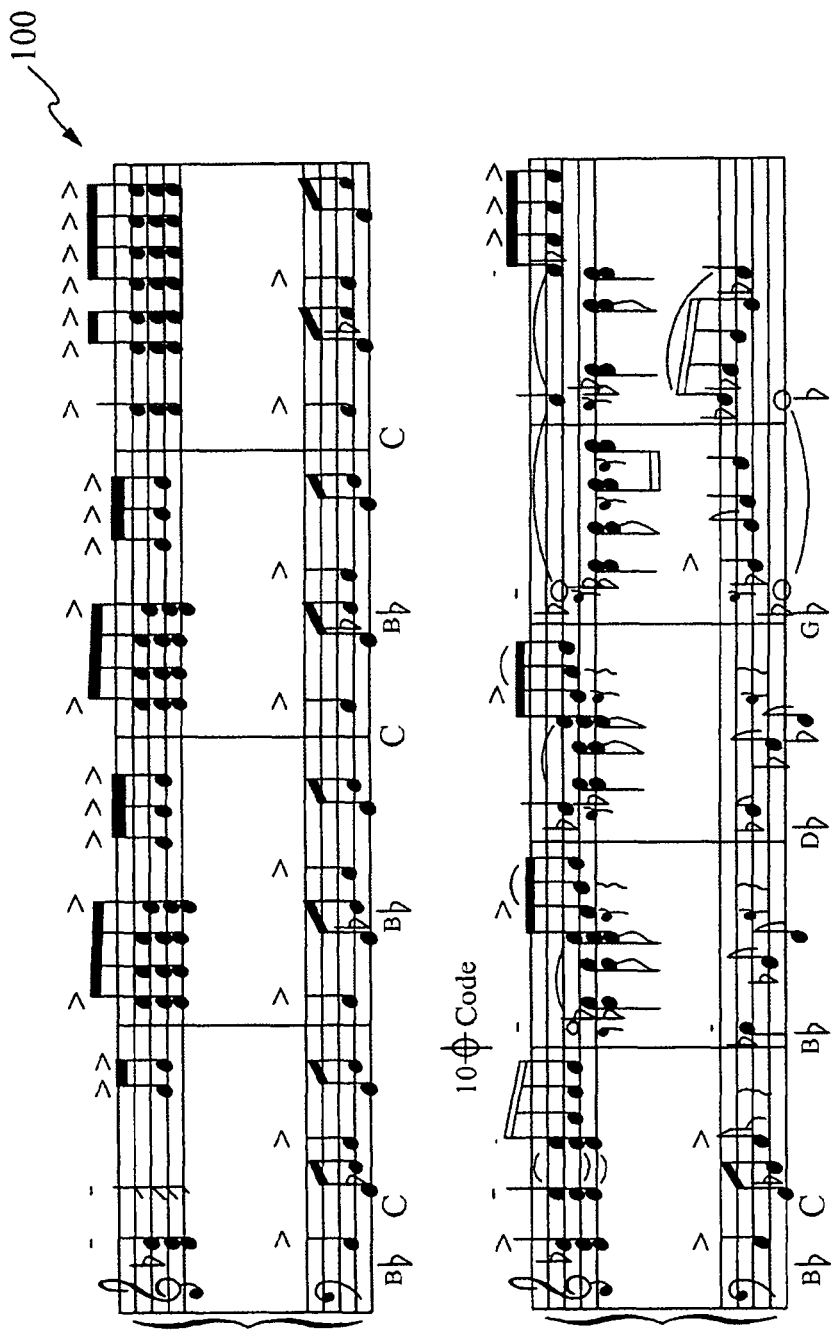
FIG. 1 is a portion of a musical piece represented in a visually perceivable manner using a traditional sheet music style comprising a sequence of notes, chords and rests.

Embodiments of the subject matter are described herein in the context of a system for automatic audio to haptics conversion. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the subject matter described herein, the components, systems, devices, process steps, and/or data structures may be manufactured, operated and/or implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising is implemented by a computer, device or a machine and the method may be stored as instructions readable by the machine, they may be stored on a tangible medium such as a computer memory device, including, but not limited to, ROM (Read Only Memory), PROM (Programmable Read Only Memory), EEPROM (Electrically Eraseable Programmable Read Only Memory, FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory. In addition it should be recognized that the method could be executed by a human operator using a selection of software tools without requiring human or creative judgment.

The system and method described herein is directed to receiving digital files and automatically converting the files into haptic events. In an embodiment, the received files are of sampled digital or digitized analog audio files. In another embodiment, the received files are structured representation files (e.g. MIDI files). It should be noted that although MIDI files are described herein in terms of structured representation files, any other protocol may be used by the system, whereby the protocol utilizes structured representation files which may be output audio, video or other signals. The converted haptic events are processed and output by an end-device in which the user experiences a pleasing haptic experience which corresponds with the audio output by the end-device and/or another device. The end-device includes, but is not limited to, audio players, mobile phones, video players, PDAs, computers, televisions, video game consoles, computer peripherals (e.g. mouse, joystick, roller ball, keyboard), steering wheels, furniture, sliders, knobs, headphones, touchscreens, portable or non-portable radios, one-way/two-way pagers and other appropriate user manipulatable devices.

It should also be noted that although the system and method is described herein to be output by an end-device, a plurality of end-devices may simultaneously or at varying times output the same haptic events and/or different portions of the same haptic events in accordance with an embodiment. It should be noted that the end device may include one or more actuators therein. In an embodiment of multiple actuators in the end device, haptic events to be output by the multiple actuators may be done simultaneously, selectively, alternately, and/or individually for each haptic event.

Figure 4:
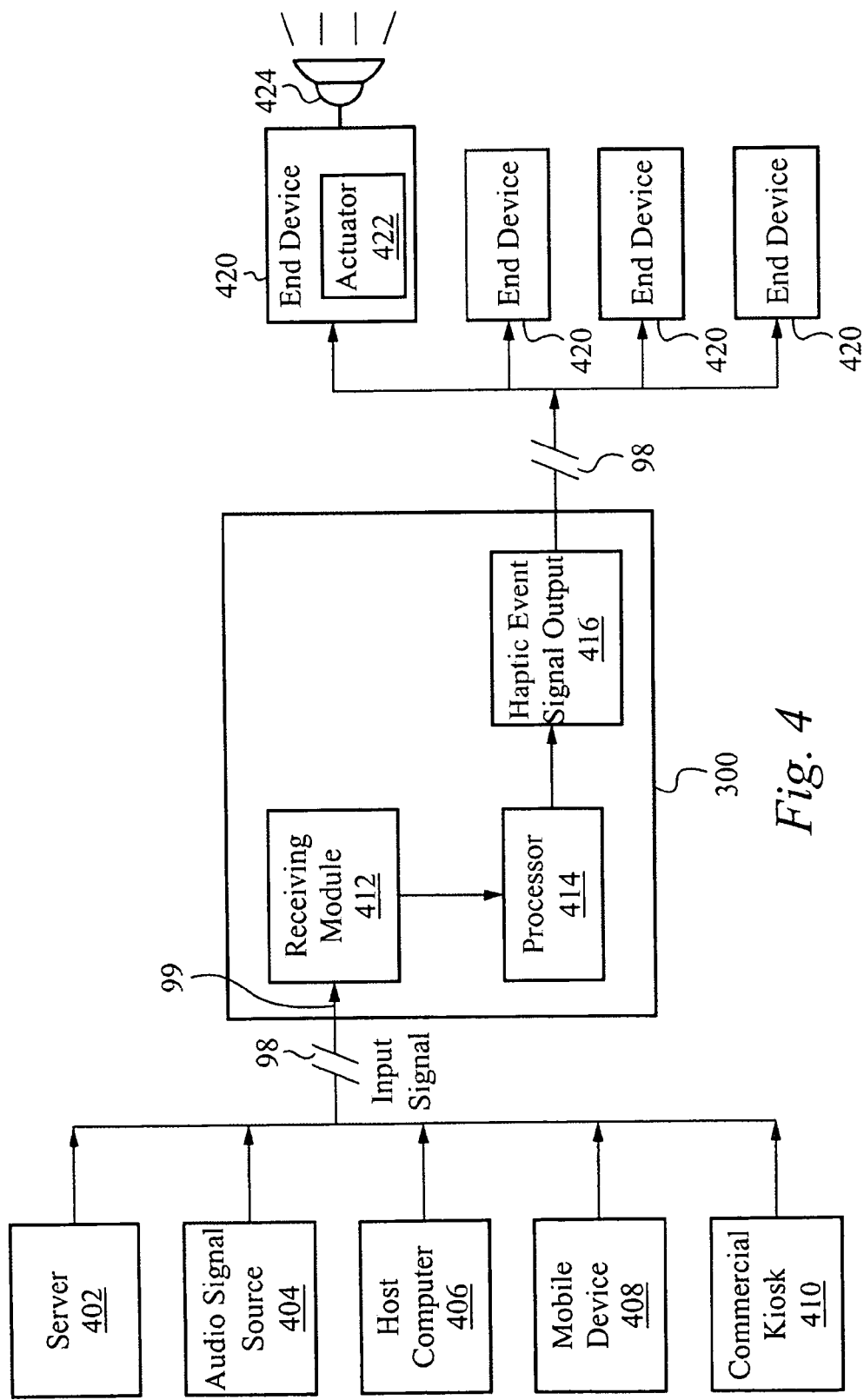
FIG. 4 is an overall architecture diagram of the system piece in accordance with an embodiment.

FIG. 4 illustrates an overall architecture embodying the system in accordance with an embodiment. As shown in FIG. 4, a variety of sources may provide the input signal 99 to the system 300. For example, the digital sampled audio signal or structured representation signal may be received from a server 402, audio signal source (CD, DVD, DAT, etc.), host computer 406, mobile device 408 and/or commercial kiosk 410. The input signal is sent over a wired or wireless private or public network 98 to a receiving module 412 of the system 300. The signal is then processed by processor 414 as discussed in more detail below. Once processed, the system 300 outputs the haptic event sequence by hard-wire or wirelessly through port 416 to one or more end devices 420. The end device 420, upon receiving the output file having the haptic event sequence (with or without accompanying audio) is then capable of outputting the haptic events using one or more actuators 422 along with an optional audio speaker 424. It should be noted that the architecture described in FIG. 4 is an embodiment, whereby additionally and/or alternative components may be utilized without departing from the scope of the subject matter described herein.

Turning now to the figures, FIG. 1 illustrates a portion 100 of a musical piece represented in a visually perceivable manner using a traditional sheet music style comprising a sequence of notes, chords and rests. The musical piece may be played and recorded, for example, in a digital sampled form or in a structured representation form. Each musical note represents a frequency of mechanical vibration. The types of notes (i.e. A, A#, B, C, C#, D, D#, E, F, F#, G, G#) are different from one another in terms of pitch. Whole notes, half notes, quarter notes, eighth notes, sixteenth notes, and the like, represent the duration of play for each note or frequency. Likewise, whole rests, half rests, quarter rests, eighth rests, sixteenth rests, and the like, represent durations of time in which no note is played. The sequence of the notes and their duration determine the representation of which frequencies will be played at which times.

Figure 2:
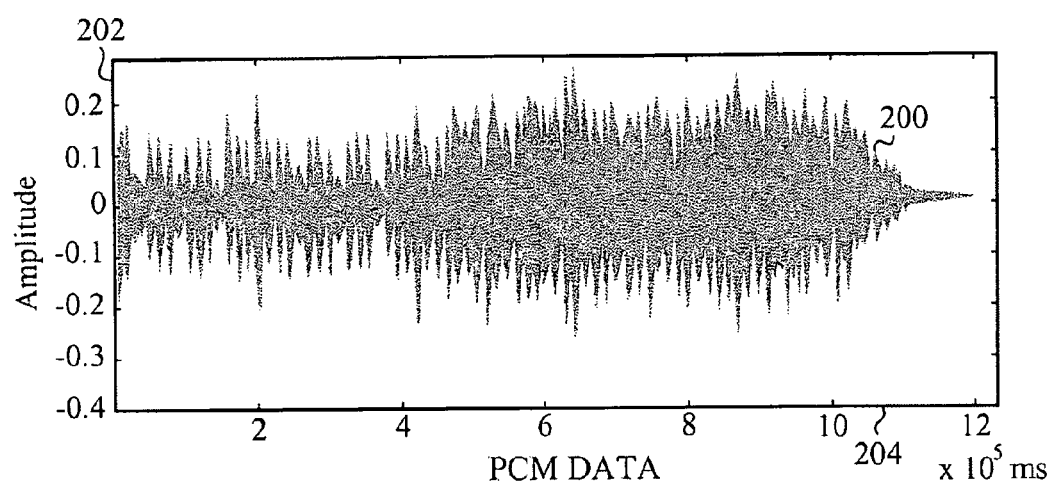
FIG. 2 is a time-amplitude graph of a portion of a sampled audio signal.

An embodiment of the present invention is directed to automatically mapping haptic events to a digital sampled audio file. Sampled audio sources (and files), which have, but are not limited to, WAV, MP3, MP4, ACC, ASX, WMA formats, all provide essentially the same type of information, such as a sample rate and a set (often left and right channels) of time ordered samples. However, unlike structured representation files, no explicit information about instruments, pitch, tempo or other musical context is available from a sampled source—only the fully rendered sounds are available. A time-amplitude graph of an example sampled audio signal is shown in FIG. 2.

Additionally, or alternatively, the system is capable of automatically mapping haptic events from a structured representational signal. In particular, given a particular structured representation of an audio file, the system is able automatically map the haptic events by analyzing the data inherently provided by the structured representational signal. However, automatically mapping either type of file, the input signal is carefully processed and analysis is simplified due to the performance limitations of the actuators in the end-device to provide the pleasing distinct haptic sequences from the audio signals in the file.

Current haptic technology is capable of playing up to about four simultaneous haptic events and operating with about a 1 ms control loop. This is due to the limitations of existing actuators. Given the limitations of existing Eccentric Rotating Mass (ERM) motor technology, playing simultaneous haptic effects can result in unexpected actuator behavior. Also ERM motors have relatively low mechanical bandwidths which limit the haptic event frequency to a maximum of about 4 haptic events per second. ERM motors also have a startup delay of about 50-80 ms before peak acceleration is achieved and this startup delay must be taken into account in creating haptic control signals to drive such ERM motors. Although ERM motors are described in the context of the described subject matter herein, it is contemplated that other types of motors or actuators may be used depending on the type of end-device, haptic effect resolution, digital quality of the to-be-converted audio, and application of use. For example only, the actuator may be a linear resonant actuator (LRA) which has resolution capabilities superior to ERM motors. Other types of actuators are contemplated including, but not limited to linear current control motors, stepper motors, magnetic actuators, pneumatic/hydraulic active actuators, torquers (motor with limited angular range), and voice coil actuators.

To provide a pleasing haptic experience to the user in contact with the haptically enabled end-device, the system should not generate haptic events that are too numerous within a period of time. In addition, the haptic events should be spaced far enough apart not to produce one constant vibration or "blur", but nonetheless be consistent with the sound effects, musical tempo and/or melodies. Exceptional events, such as a change of key, melodic transitions, and the like, should often be highlighted by the haptic event. The musical rhythm should often be accented by identifying the tempo of the audio program signal and the phase offset of that tempo relative to the beginning of the audio program signal. Audio events which have a substantial amount of silence beforehand may also be likely haptic events due to their accent in the music (e.g. cymbals, car crashing as a sound effect).

Figure 3:
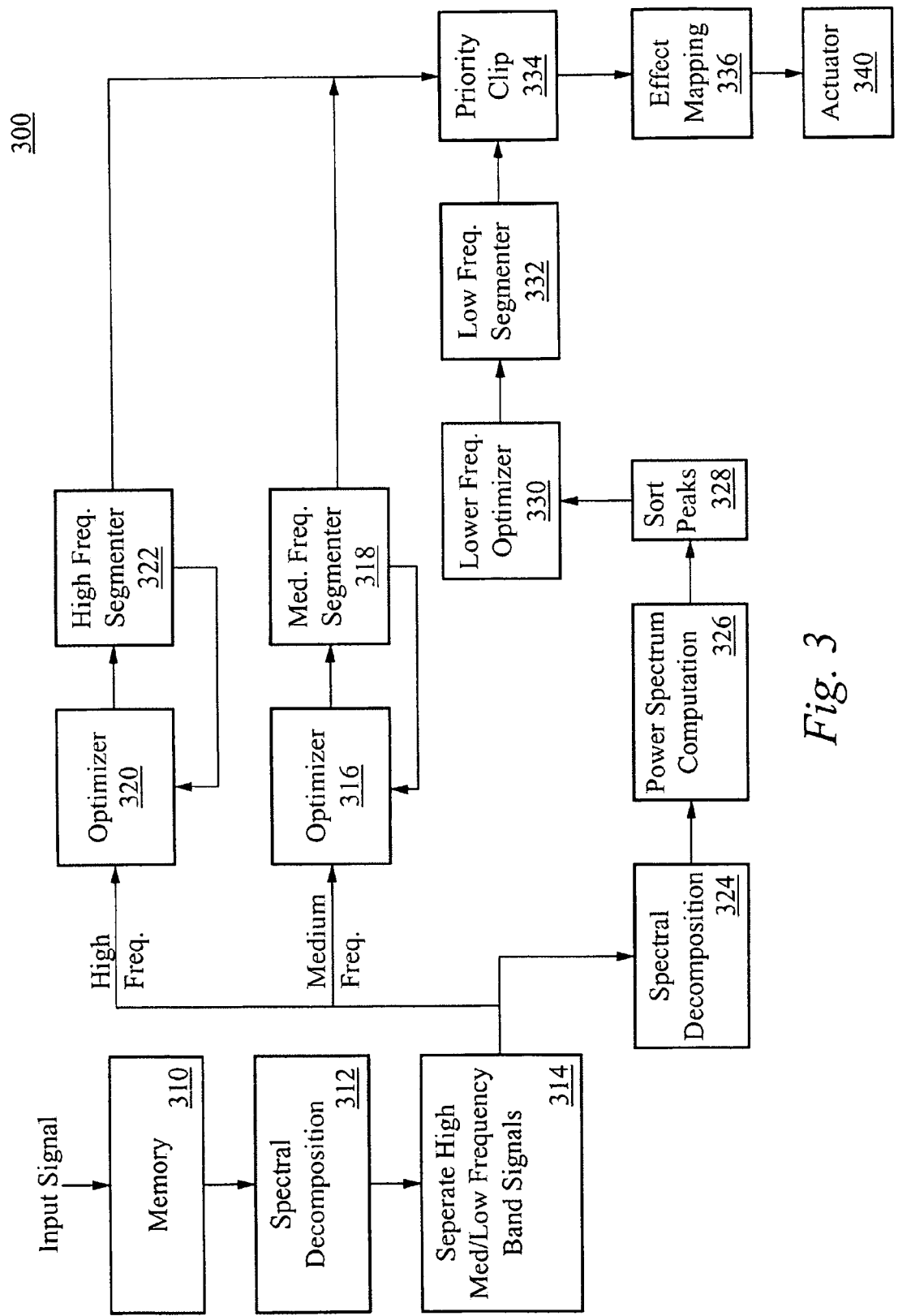
FIG. 3 is a process flow diagram illustrating a method for haptic effect mapping in accordance with an embodiment.

FIG. 3 is a process block diagram illustrating a system and method for haptic effect mapping of a received digitized sampled audio signal in accordance with an embodiment. In general, according to an embodiment, the received sampled audio input is received and automatically "converted" or "mapped" by the system to form a haptic control signal or haptic event which controls the playback of haptic effects in the end device to be in synchrony with the playback of identified audio events in the signal. The blocks in FIG. 3 are designated as generic components which may be analog or digital hardware, including but not limited to, hardwired circuits, Integrated Circuits and ASICs. Additionally or alternatively, the blocks in FIG. 3 are software code components such as routines, subroutines, code, threads and the like embodied in or utilized by processors and memories.

In accordance with the embodiment in FIG. 3, the received sampled audio signal is loaded into memory of a computational device in block 310. The computational device may be a conventional personal computer, a processing module, server, client, the end-device itself defined above, or any other electronic device having sufficient processing capabilities. The sampled audio signal may be taken from a compact disc (CD), mini-disc, DVD, DAT, hard-drive or other media. In an embodiment, the audio signal may be downloaded directly (wired or wirelessly) from a commercial or non-commercial website which is then converted and playable by the end-device. In another embodiment, audio tracks are converted remotely and then stored on a server, whereby the converted haptic tracks are able to be downloaded directly from the server to one or more end-devices to be played. In an embodiment, the received file is processed by the system off-line, whereby the system processes a portion or the entire file after it has been received. In an embodiment, the received file is processed by the system in a real time manner, whereby the system processes and outputs the data as the file is being received.

The received file may be input into a file reader/player which included in a commercial computer software program such as Microsoft Windows Media Player® RealPlayer®, iTunes®, MusicMatch Jukebox®, or other proprietary program on a server and/or end-device. Alternatively, any codec (encoder-decoder) that generates PCM type output may be used in conjunction with the system.

In an embodiment, the system receives the sampled audio as a single (monaural) input signal. In an embodiment, the system receives the sampled audio as stereo or multi-channel inputs which may be converted or mapped by pre-mixing or sub-selecting, for example. Additionally, multiple haptic tracks could be processed simultaneously or at different times, if desired.

After the input signal is loaded into an optional memory of the system in an embodiment. The system retrieves the signal from the memory and analyzes the input signal in terms of its energy content per time and frequency in block 312. In an embodiment, the system uses a windowed Fast Fourier Transform (FFT) algorithm to produce energy distribution data of the audio signal in block 312. In an embodiment, any another appropriate procedure or algorithm, including but not limited to wavelet transform, is utilized to produce energy distribution information of the signal. The spectral decomposition analysis may also produce phase information encoded as complex coefficients which may be utilized by the system in processing the signal.

In an embodiment, the system utilizes a compensation factor to the spectral decomposition calculations to account for the Human Ear transfer function and perceptual factors prior to segmentation of the frequency sub-bands. For instance, the human ear is more sensitive to sounds at 3-4 kHz as opposed to sounds at 60 Hz. In an example, the system will attenuate frequency content around 60 Hz by approximately 40 dB whereas content at frequencies between 3 kHz and 4 kHz is not attenuated. Therefore, even though there may be significantly more energy in a 60 Hz beat, the user will likely perceive a beat in a higher frequency band as more prominent due to the attenuation.

Similarly, the audio transfer function of the speakers for the target haptic device can be taken into consideration and applied to the spectral decomposition prior to segmentation. For example, the frequency response on most cell phone speakers is such that frequencies below 200 Hz are not transmitted. Therefore, emphasizing a beat under 200 Hz might yield unexpected haptic effects when accompanying the audio signal rendered by such speakers. Ignoring these frequency bands in the spectral decomposition in processing may give more consistent results.

In an embodiment, the system utilizes the absolute value of the complex coefficients from the spectral decomposition analysis to map the energy distribution of the audio signal in terms of frequency to allow the designation of sub-band signals and crossover frequencies of the audio signal. This is designated in block 314 in FIG. 3.

Figure 5:
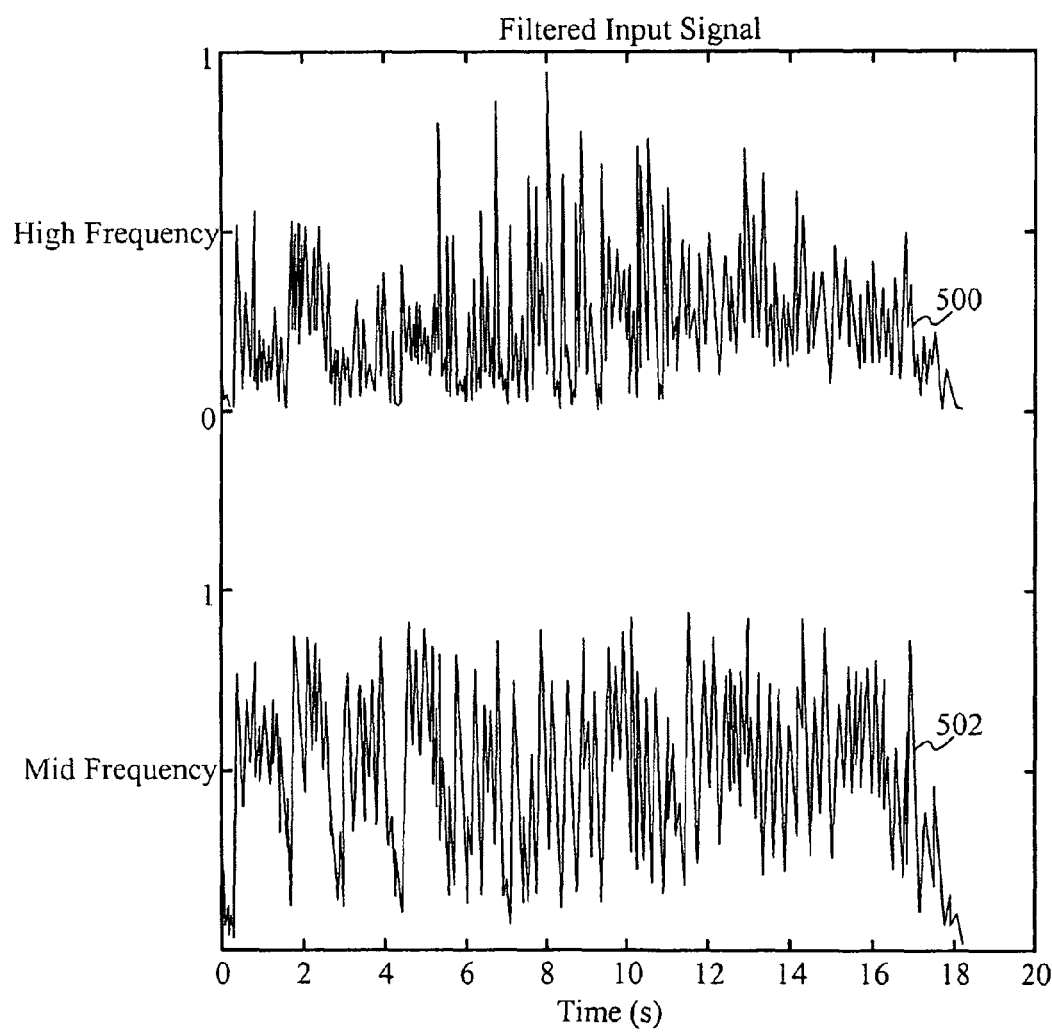
FIG. 5 is a filtered time-amplitude graph showing high-frequency and medium-frequency sub-band signals for the musical piece of FIG. 4 in accordance with an embodiment.

As shown in FIG. 3, the system and method determines a number of sub-band frequencies from the energy distribution of the input audio signal at block 314. As stated above, the system may perform this analysis using software, analog or digital hardware and/or firmware. In an embodiment, the system analyzes the energy distribution of the signal and designates the energy into three sub-band categories based on frequencies. In an embodiment, the sub-band categories are high frequency sub-bands, medium frequency sub-bands, and low frequency sub-bands. FIG. 5 illustrates an example filtered time-frequency graph showing the high-frequency sub-band signal 500 and the medium-frequency sub-band signal 502 of the input audio signal. In an embodiment, the system and method designates the energy distribution of the input audio signal into to more or less than three sub-band categories.

In an embodiment, the low-frequency sub-band is designated by the system to be within a range of low frequency values, whereas the high-frequency sub-band is designated to be within a range of high frequency values. The system designates a medium-frequency sub-band to be between the highest frequency in the low sub-band and the lowest frequency in the high sub-band. It should be noted that each of the frequency sub-band ranges are not limited to those discussed, and each sub-band can be designated to have any upper and lower frequency limits based on the desire of the designer. In an embodiment, the low, medium and high frequency ranges are determined by the system based on a global average of a power spectrum of the entire signal or segmented portions of the entire signal. It is contemplated that the low, medium and high frequency ranges may be determined by the system utilizing any other appropriate methods.

In particular, the system and method analyzes the input audio signal in terms of sub-band crossover frequencies. In an embodiment, the system calculates one or more sub-band crossover frequencies $f_m$ between the low-frequency sub-band and the medium-frequency sub-band. Additionally, the system and method calculates one or more sub-band crossover frequencies $f_h$ between the medium-frequency sub-band and the high-frequency sub-band. In an example, $f_m$ is designated to be in a range of approximately 300 Hz to approximately 1000 Hz. In an example, $f_h$ is designated in a range of approximately 3500 Hz to approximately 5000 Hz. It should be noted that these ranges are only examples and that other frequency ranges are contemplated within the scope of the system and method.

In an embodiment, the $f_m$ and the $f_h$ frequencies are computed as the mean values of the 15th and 85th percentile spectral rolloff in which the spectral rolloff is the frequency below which a specified percentage of the total energy of the audio input signal can be found. These specified percentages may be computed from the energy distribution of the signal calculated in block 312. It should be noted that other spectral roll off percentiles are contemplated and are not necessarily limited to the 15th and 85th percentile. In an embodiment, the system and method normalizes the energy for designated frequencies in each time window and calculates the cumulative value that corresponds to the specified percentile. It should be noted that this is one method of calculating the cross-over frequencies and other methods of calculating the cross-over frequencies are contemplated. For example, in an embodiment, the sub-band signal crossover frequencies may be computed by calculating the FFT of the entire signal and calculating the roll-off values. Three sub-band signals may then be constructed from the energy distribution (e.g. spectrogram) of the input audio signal by summing the energy values in each sub-band. This procedure may also serve to down-sample the input signal since the 44 KHz time information (the original audio sample rate) may be converted to 128 Hz time data during the spectral decomposition computation.

In an embodiment, the high- medium- and low-frequency sub-band signals are each segmented and are processed by the system. As shown in FIG. 3, the medium frequency sub-band signal is sent to a medium band optimizer, designated by block 316. The medium band optimizer 316 generates a track of discrete events corresponding to a desired number of effects per second (EPS). In an embodiment, the targeted EPS are defined by the user, although the EPS may be defined based on certain factors, including, but not limited to, resolution of the actuator, type of music, type of end-device, and processing capabilities of the system or the user's desire.

The system enforces a minimum separation between haptic events to permit the actuator in the end-device an appropriate time to start up and wind down for each haptic effect that it outputs. This minimum separation allows the actuator in the end-device to produce discrete multiple haptic events and prevents two or more haptic events from overlapping or producing a "blurred" feeling of portions of multiple haptic effects overlapping each other. In an embodiment, the amount of time limited between the haptic events is 50 ms, and the specified duration is between 100-250 ms, depending on the sub-band. It should be noted that the system is not limited to these values and other values are contemplated.

The medium band optimizer 316 attempts to capture the melody of vocal events by generating the track of discrete haptic events to correspond to the vocal melody in the audio input signal. The system thus utilizes the clipping parameter to identify the events with the highest amount of energy within the target range of the desired EPS.

Upon the clipped input signal being output from the medium band optimizer 316, the signal is input into a local segmenter 318, as shown in FIG. 3. In general, the local segmenter 318 utilizes an algorithm which compares a long time-average of the clipped input signal with a short-time value of the clipped input signal to segment the medium frequency sub-band signal into a series of start and end times for each event. As shown by the arrow in FIG. 3, the local segmenter 318 then provides this information back to the optimizer 316, whereby the optimizer 316 applies a one-dimensional line search to monotonically adjust one or more clipping parameters until the segmentation of discrete events is in the target range of the desired EPS. In an embodiment, this process is repeated until the desired number of EPS is reached for the signal. In an embodiment, the segmentation process is repeated for a pre-set number of iterations. The particulars of the segmentation process will now be discussed.

Figure 6:
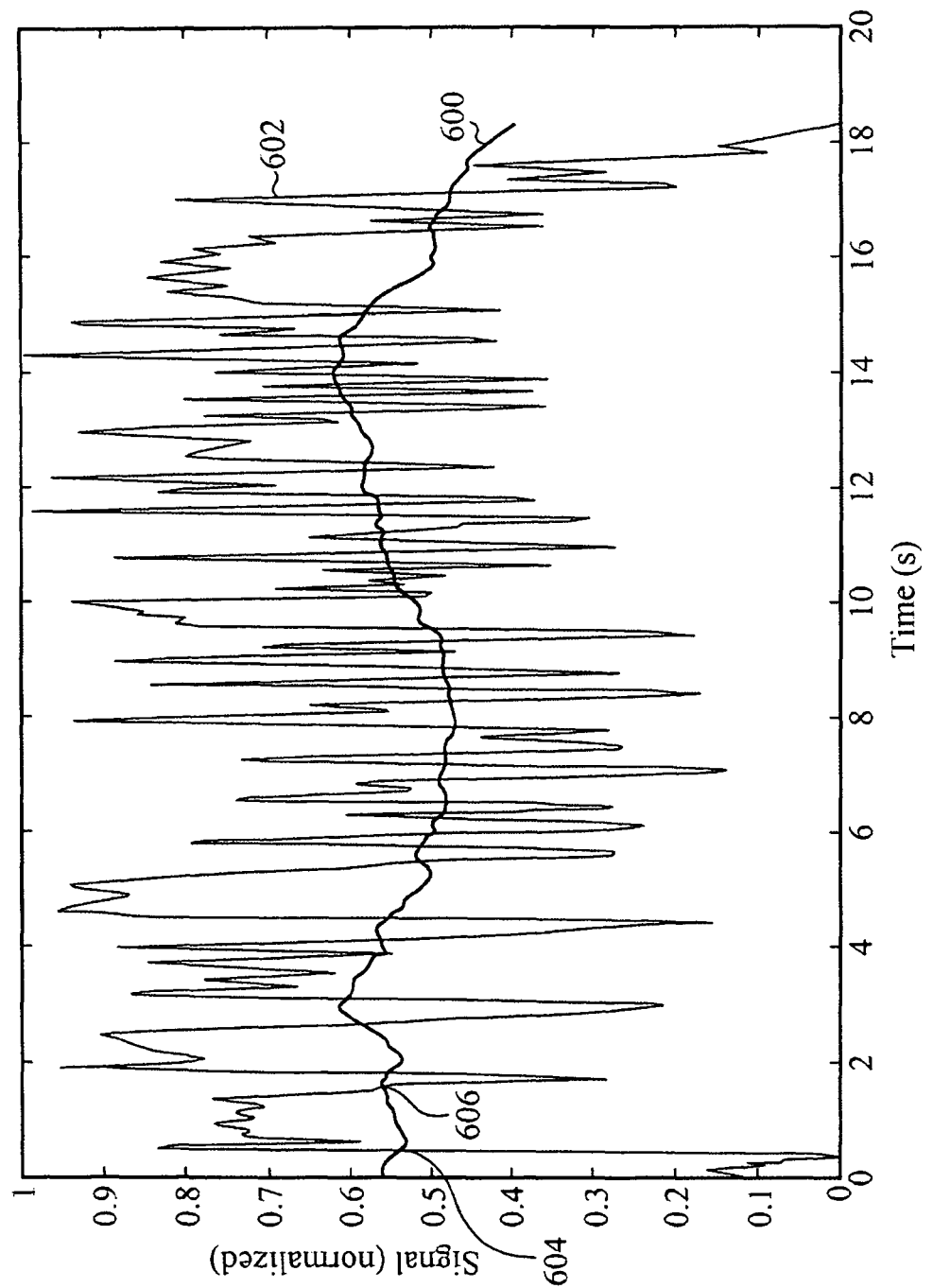
FIG. 6 is a normalized time-signal graph showing a representation of average power and instantaneous power used to segment the medium-frequency sub-band signal in accordance with an embodiment.

FIG. 6 illustrates a time-signal graph showing a representation of average power and short-time power used to segment the medium frequency sub-band signal into the discrete haptic events in accordance with an embodiment. The graph of FIG. 6 illustrates the time-average 600 of the medium frequency sub-band signal as well as the short-time signal values 602 within a 20 second window. It should be noted that other time duration windows may be utilized by the system.

The short-time signal value, in an embodiment, may be obtained by low-pass filtering the input audio signal through a 5 Hz Butterworth filter. It should be noted that the input signal is filtered utilizing any other device or method in either the analog or digital domains. In an embodiment, the system creates a new event at a certain time where the short-time average value signal exceeds a specified threshold for that point in time. In terms of the graph of FIG. 6, the event begins and ends at the points where the short time average values cross the long time average in a desired direction (e.g. upwardly or downwardly). For example, in FIG. 6, the local segmenter 318 determines where an event begins (point 604) by identifying where the short time average 602 crosses the long term average line 600 in an upward direction. The local segmenter 318 may also determine where the event ends by identifying where the short time average 602 crosses the long term average line 600 in a downward direction (point 606). It should be noted that the above is only an example of a segmentation process and it is apparent that other segmentation processes and algorithms may be used by the system.

For low and high frequencies, it is common for there to be more events that qualify as haptic events than the actuator in the end-device can effectively produce per second. The optimization process discussed above in regards to medium frequency sub-bands are not preferred for higher and lower frequency sub-bands due to the large number of closely spaced frequency peaks which are usually inherent in high and low frequency sub-bands (FIG. 5). These large number of closely spaced frequency peaks may cause the actuator to produce aliased results inconsistent with the tempo of the input audio signal.

To address this issue, the system utilizes a different optimization and segmentation approach for signals in the high and low frequency sub-bands than that of the medium frequency sub-bands. FIG. 3 illustrates that the high and low frequency sub-bands are processed differently by the system. In regards to the high frequency sub-band, aliasing is a concern which the system takes into account when processing the signal. Thus, haptic events generated without consideration for this aliasing may follow a beat or rhythm that is inconsistent with the music.

In general, as shown in FIG. 3, the system includes a high frequency optimizer 320 block which performs a one-dimensional (1-D) line search to adjust one or more clipping parameters on the high frequency signals. The optimizer block 320 uses a measure of the amount of aliasing in the output signal and adjusts the clipping value which is then provided to the segmenter block 322. The high sub-band segmenter 322 determines the start and/or end times of each haptic event and provides the result back to the optimizer block 320 as shown by the arrow. The optimizer 320 then adjusts the clipping value in response until the targeted alias level is reached or a certain number of pre-defined steps have occurred.

Aliasing is measured by examining the distribution of differences between the start times of generated haptic events. If this distribution has a very large peak at the same delta as the minimum effect separation dictated by the actuator, the segmentation result is considered to have high aliasing. A reasonable target alias value might be 30%, which means that 30% of the effects have start times that differ by exactly the minimum separation value The algorithm used in the Segment block 322 may be the same as that used by the medium sub-band 320 in an embodiment. In an embodiment, the algorithm used to process high frequency sub-band signals by block 322 is similar to the algorithm performed by the block 318 for medium-frequency sub-band signals, but with several differences. In an embodiment, the long time average is 50 ms for high frequency signals.

In an embodiment, the input signal is pre-processed to increase the signal to noise ratio (S/N). The S/N may be computed to be the ratio of the mean of the clipped signal to the maximum value of the signal, whereby the processed signal is computed by subtracting the scaled 1.5 second moving average from the input signal and setting negative values to zero. It should be noted that this is only an example, and the system is able to utilize another method to improve the signal to noise ratio in the signal.

In an embodiment, the haptic effects which are measured to be longer than 250 ms are clipped to a maximum of 250 ms for high frequency signals. In an embodiment, new segments are produced only if the clipped signal is greater than the highest peak in the most recent 50 ms window. It should be noted that the above are examples and are not limited to those factors described above. It should also be noted that one or more of the above factors may be utilized in performing the algorithm. The result of the high-frequency sub-band segmentation is typically a set of short haptic events that roughly correspond to the tempo of the input audio signal.

Referring back to FIG. 3, in an embodiment, the low frequency sub-band signals are processed differently than the medium frequency sub-band signals. The low-frequency portion of the input audio signal typically corresponds to the rhythm of the music and is also typically dominated by various types of percussion instruments and/or very low frequency vocals (e.g. bass vocals). As with the high frequencies, the system and method processes the low frequency sub-band signals to generate haptic events that are consistent with the rhythm and do produce excessive aliasing artifacts. It is common that the drum beats in the music are within a certain frequency range within the low frequency sub-band spectrum. Thus, in an embodiment, the system considers a narrow range of frequencies in the low-frequency sub-band to identify the beats.

In an embodiment, the system identifies this specific range of frequencies by first performing a spectral decomposition analysis (block 324) of the low-frequency sub-band signal of the original input signal using a much longer time frame window as compared to that in block 312. In an embodiment, the time frame window is ⅟32 second or 31 ms, although other durations are contemplated and not limited to 31 ms. The time frame window provides significantly more resolution in the low-frequency range than the spectral decomposition computed at block 312 to evaluate the spectral rolloff of the signal. Once the system and method calculates the higher resolution energy distribution (block 324), the system calculates a power spectrum of the signal. This is performed by block 326, in which the system sums the energy distribution from the spectral decomposition over the designated time window. It should be noted that although the input signal is shown to undergo two different spectral decomposition analyses (blocks 312 and 324 in FIG. 3), the spectral decomposition of the low frequency sub-band signal may alternatively be done in block 312, whereby the results are utilized by block 326 in computing the power spectrum of the low frequency sub-band signal.

The system and method utilizes the power spectrum calculations (block 326) on the low frequency sub-band signal to sort the frequencies based on power level (block 328). It is common that several frequencies may correspond to the same peak in the power spectrum, whereby the redundant frequencies would be eliminated to allow more efficient sorting of the frequency peaks.

Figure 7:
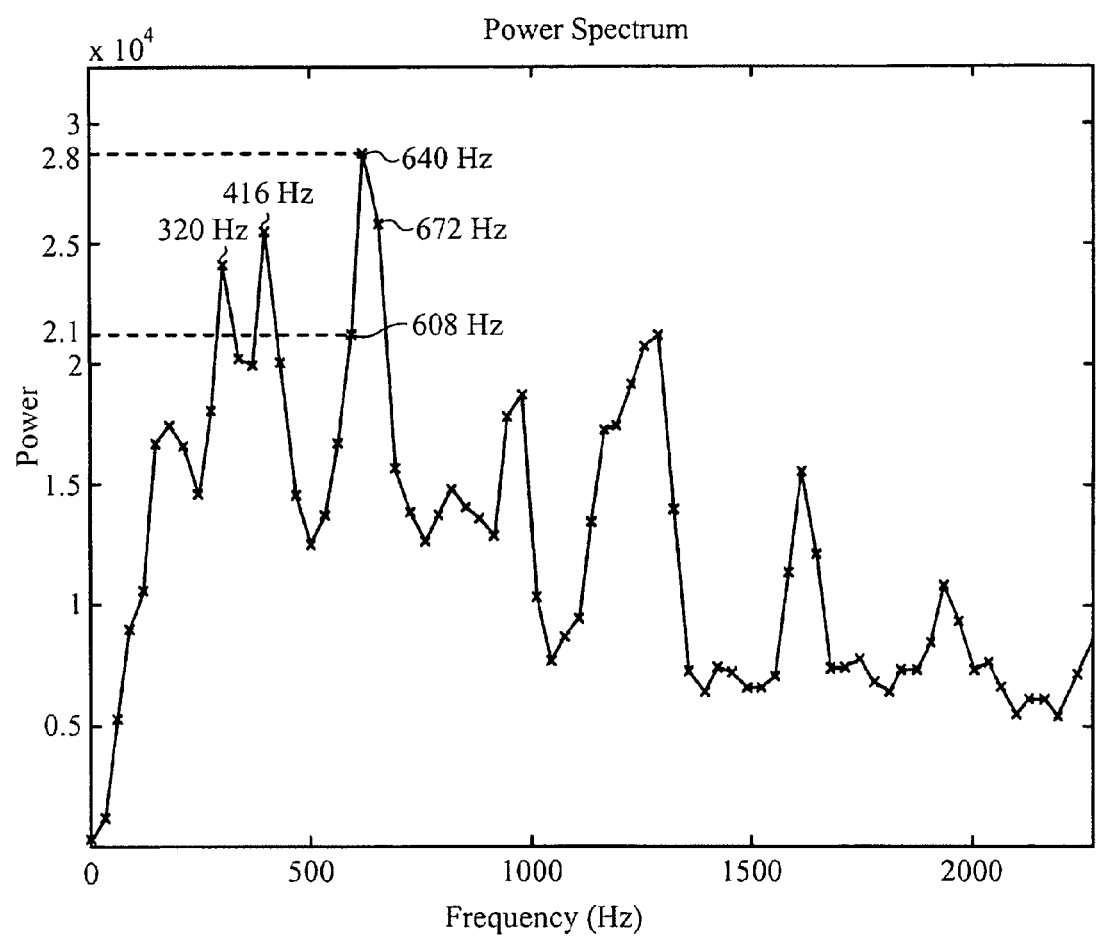
FIG. 7 is a frequency-power graph used to segment the low-frequency sub-band signal in accordance with an embodiment.

FIG. 7 illustrates a frequency-power graph (i.e. power spectrum) used to segment the low-frequency sub-band signal in accordance with an embodiment. The power spectrum represents the amount of energy present in the input signal in a set number of frequency bins. This information is used by the system to sort the frequency into bins of total power. For example, a bin of total power between 2.1 and 2.8 (×104) has the frequency peaks of 640 Hz, 672 Hz, 416 Hz, 320 Hz and 608 Hz, ranked in descending total power.

To eliminate these redundant frequencies as well as to eliminate other peaks that may carry the exact same temporal distribution of energy or power, such as the same beat, a cross-correlation matrix between the temporal signals associated with each frequency bin is computed by the system, which is discussed in more detail below. In an embodiment, the correlation matrix will have an approximate high value at location (i,j) if the time signal at frequency bin fi and at fj are positively correlated. In accordance with an embodiment, all the frequency bins are clipped that have a correlation coefficient higher than 0.5 with a bin that has a higher associated power. In other words, the system will retain the highest energy signal and not use the lower energy signals that are above the clipped correlation coefficient. It should be noted that the correlation coefficient is not limited to 0.5 and values other than 0.5 are contemplated. For those remaining frequencies, the algorithm utilized in block 324 uses the optimizer and segmenter (blocks 330, 332) with a maximum alias target of 15%, although other target percentages are contemplated.

In an embodiment, the system computes correlation coefficients between all successive frequency bins in the low frequency band. Audio segments corresponding to periodic snare drum beats, hand claps, etc. are usually high bandwidth events and are most easily identified by searching for the maximum correlation coefficients. The frequency band with the highest correlation coefficient to the next frequency is selected by the system for further processing in the low-pass detection algorithm. The correlation coefficients of two random variables x and y is given by:

$$\text{cor}(x, y) = E(x, y) - \frac{E(x)E(y)}{\sqrt{\sigma_x^2 \sigma_y^2}} \quad (1)$$

After the high-, medium- and low-frequency signals have been clipped and segmented, as described above, the system and method will generate a list of candidate haptic events for each of the sub-band signals. In particular, as shown in FIG. 3, the segmented high frequency sub-band signals are passed from the high frequency Segment block 322 to the priority clip block 334. In addition, the segmented medium frequency sub-band signals are passed from the block 318 to the priority clip summation block 334. Further, the segmented low frequency sub-band signals are passed from block 332 to the priority clip block 334.

It is possible for the system and method to simply output the haptic events directly without passing them through the priority clip block 334, however doing so would possibly yield muddled or blurred haptic sensations by the actuator in the end-device. This would be due to several haptic events overlapping in time. To overcome this, the system utilizes the priority clip block 334 to prioritize the candidate haptic events from each of the sub-band signals.

In particular, the priority clip block 334 may prevent more than one haptic event, from same or different frequency sub-bands, to be output by the actuator if they fall within a specified time period of one another. This also prevents overlapping sharp and strong events from canceling one another out. For instance, a sharp event (see below), such as a braking pulse, may terminate a strong event prematurely if both are to be output by the actuator at the same or substantially the same time.

In accordance with an embodiment, any priority of low-, medium- and high-frequency haptic events may be output by the priority clip block 334 regardless of their overlap. In an embodiment, a sub-band of frequencies could be assigned priority when two haptic events from different sub-bands are detected to overlap one another. This priority could be assigned based on the particular genre of music; the tempo of the song; the resolution of the actuator; and/or the amount of information in the input audio signal (e.g. lossy vs. lossless).

As shown in FIG. 3, the priority clip block 334 outputs the prioritized haptic events to the effect mapping block 336. In an embodiment, the effect mapping block receives the prioritized haptic events and assigns haptic effects to these discrete events. In an embodiment, the system utilizes two basic haptic effect types: periodic and magnitude-dependent. Periodic effects allow the period or speed of vibration to be explicitly controlled independent of magnitude. Periodic effects accurately produce vibration frequencies up to about 30 Hz, depending on the device. Magnitude-dependent effects vibrate at a magnitude- and device-dependent rate.

These two effect types are further characterized with three actuation styles or effects: strong, smooth and sharp. Each style has a different control mechanism, resulting in a slightly different sensation to the user. Strong effects are the effects which feel strongest to the user. Smooth effects have the characteristics wherein the strength of the effect is diminished to achieve higher frequencies for periodic effects. For the magnitude-dependent effects, the effect strength does not diminish. Sharp effects achieve the highest frequencies for periodic effects without diminishing strength, although strength diminishes significantly for magnitude-dependent effects.

Each effect includes parameters which are adjustable or able to be set by the system or by a user. Such parameters for periodic haptic effects include, but are not limited to, magnitude, period/frequency, duration, attack time, attack level, fade time, fade level and envelope. Parameters for magnitude-dependent haptic effects include, but are not limited to magnitude, duration and envelope. The described haptic effects and assignments shown above are illustrative only, and it should be recognized that a multitude of haptic effects and assignments may be used. The generated effects also have an optional magnitude specification which is usually taken as the maximum value of the signal (normalized to 0-10000) over the segment.

Figure 8:
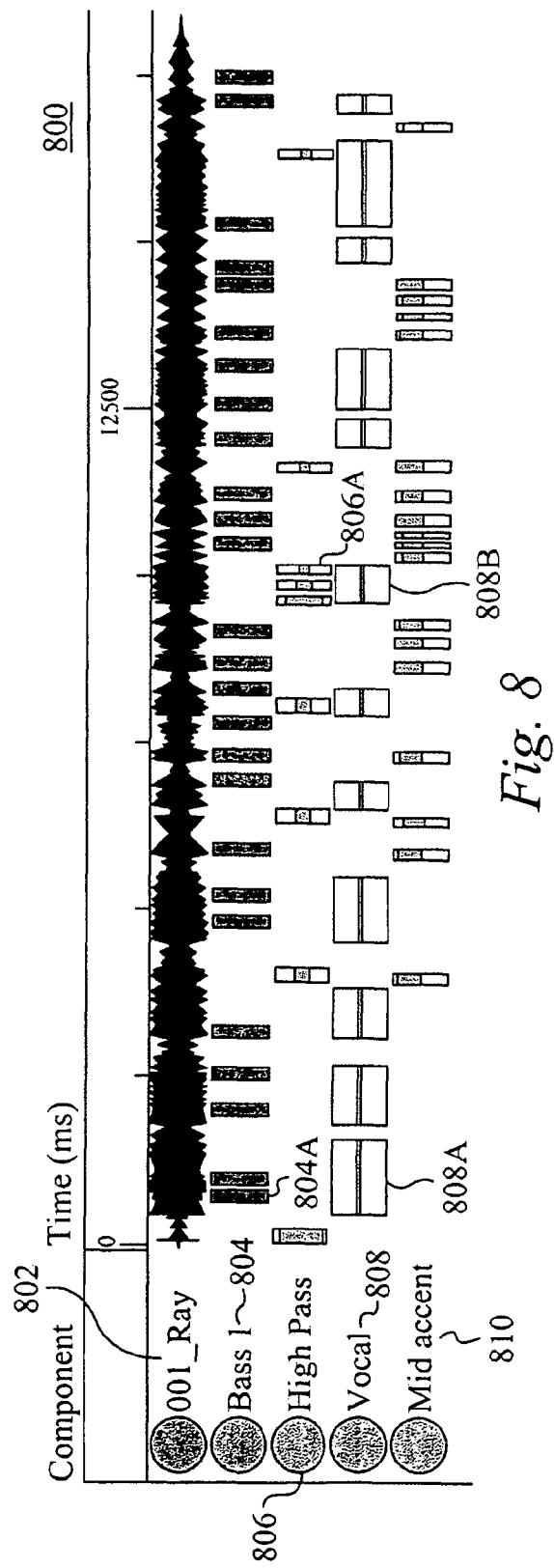
FIG. 8 is a time-symbol representation of a sequence of haptic effects for the FIG. 4 musical piece example in accordance with an embodiment.

FIG. 8 illustrates an example time-symbol representation of a sequence of haptic events for a musical piece associated with the input audio signal discussed above. As shown in FIG. 8, the time-symbol representation 800 includes a time-frequency graph of the input audio signal 802. In addition, the representation 800 includes the low frequency sub-band, designated as Bass 804; the high frequency sub-band, designated as High Pass 806; and two medium frequency sub-bands, designated as Vocal 808 and Mid Accent 810.

As shown in FIG. 8, the system maps the haptic events in the each sub-band such that only one haptic event occurs at a time and is separated from the neighboring haptic effects by a designated time duration. In an embodiment, the system will allow more than one haptic event to occur at a time where the haptic effect profile for each event is not similar to one another. For example, as shown in FIG. 8, the system will allow strong magnitude dependent effects 808A, 808B and short periodic effects 804A, 806A to be overlapped considering they would be effectively felt by the user as two separate events. In the example representation shown in FIG. 8, the system is configured to give priority to the low-frequency haptic events over the high-frequency haptic events while the medium-frequency events are allowed to overlap with the high and low frequency events. It should be noted that the system is configurable by the user, the end device, or by the input audio signal itself, to give priority and overlapping rights to any or all of the frequency sub-bands, and is not limited to that shown in FIG. 8.

The above discusses one or more embodiments in which the system is able to automatically receive, identify and produce haptic events which correspond with the sampled audio signal and are output in a pleasant manner to the user. The system is also able to receive and process representationally structured encoded music files including, but not limited to MIDI files, to produce haptic events which correspond with the encoded music files. It should be noted that although the representationally structured files are described herein as music files, the representationally structured files may be files having sound effects, or other events associated with audio.

Figure 9:
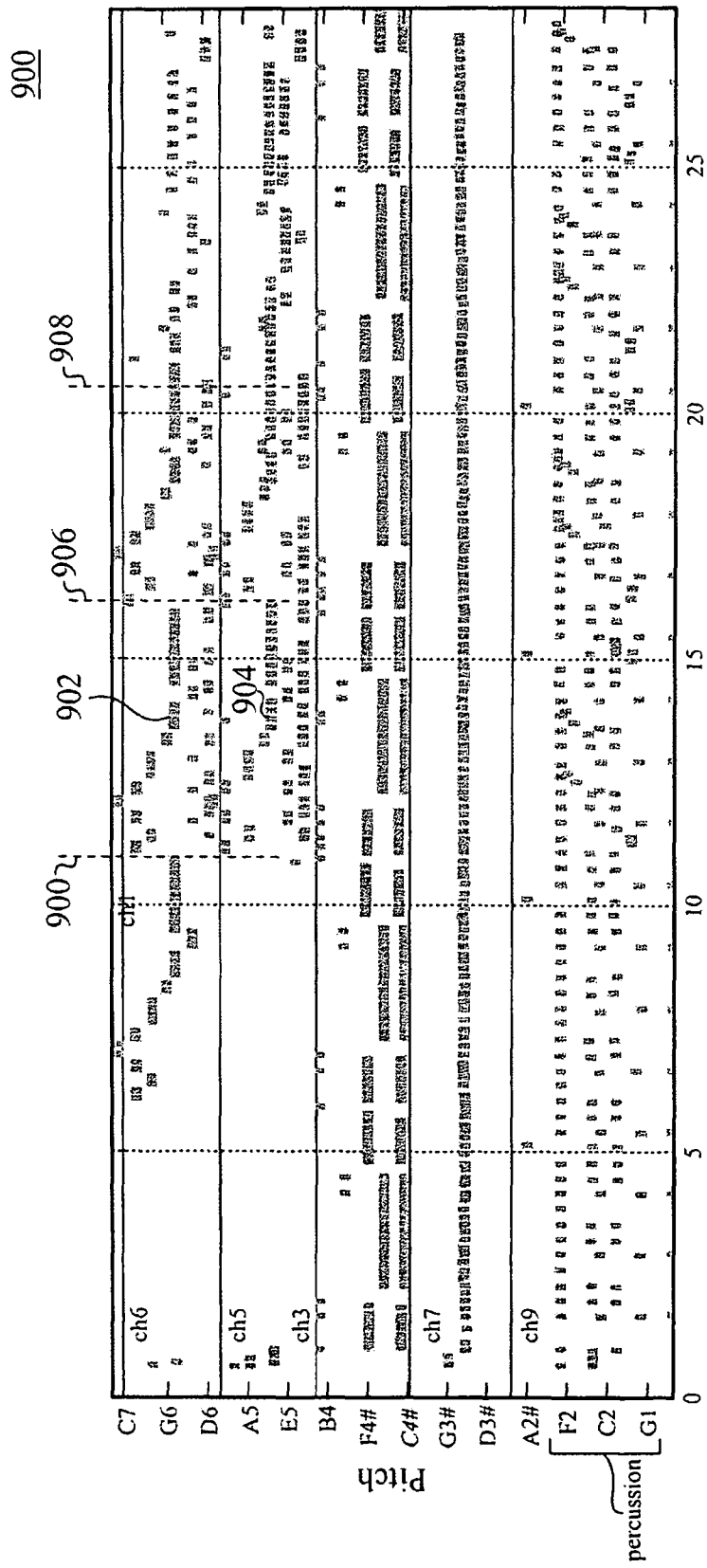
FIG. 9 is a time-note representation of a series of MIDI events making up a musical piece in accordance with an embodiment.

FIG. 9 is a time-note representation of a series of MIDI events making up a musical piece in accordance with an embodiment. The MIDI file format may include 16 channels of simultaneous instruments, whereby each channel is capable of having events up to 127 unique pitches (called keys) that can be played. In addition, the MIDI file format includes a channel reserved for percussion instruments which are generally pitchless. Percussion instruments are distributed across the range of keys in percussion channel.

Figure 10:
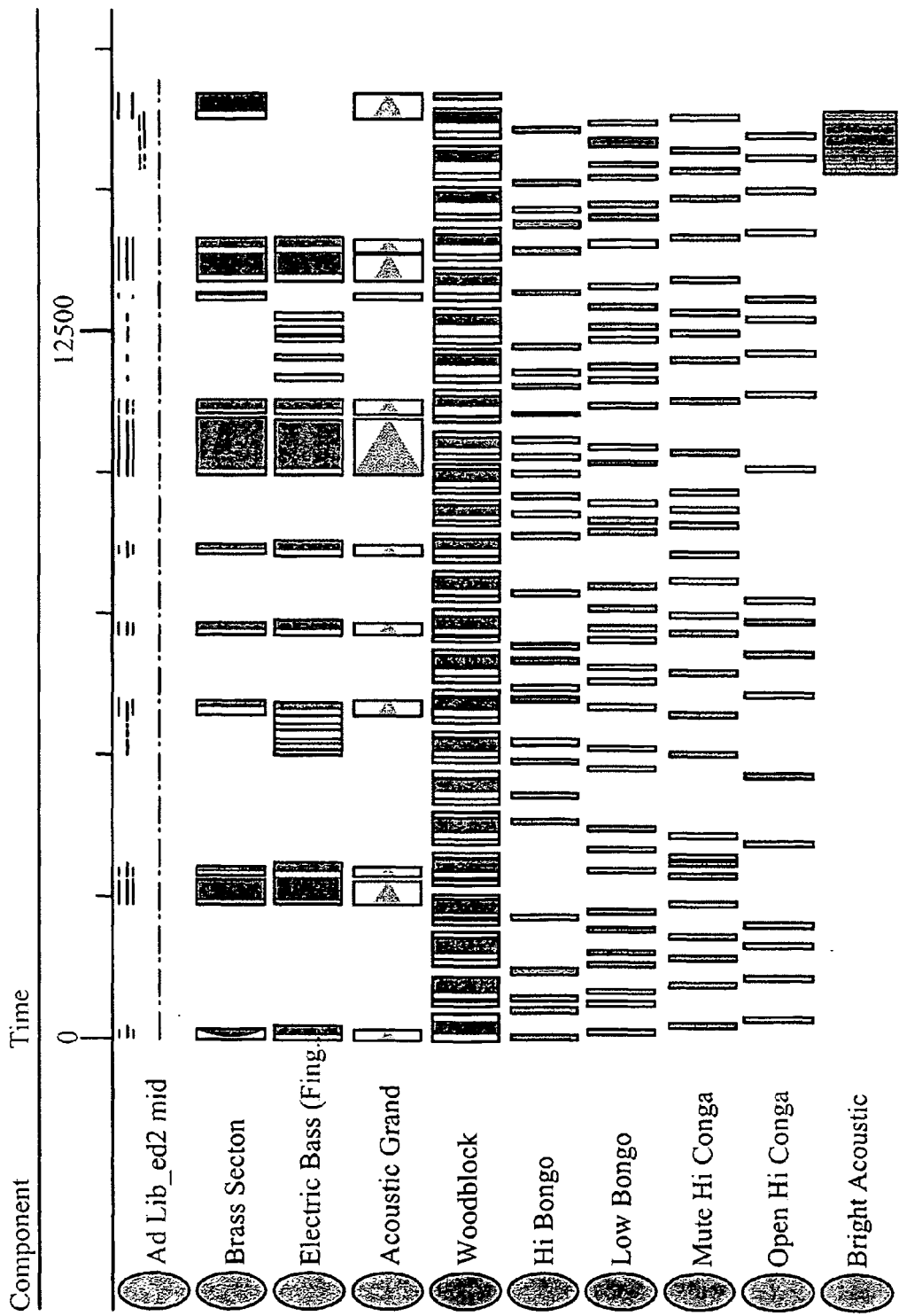
FIG. 10 is an alternative time-instrument-note representation of a series of MIDI events making up a musical piece in accordance with an embodiment.

FIG. 10 illustrates a time-instrument-note representation of a series of MIDI events making up a musical piece in accordance with an embodiment. In a MIDI music file, every note of every instrument is an event that may be designated by the system to be a haptic event. However, considering the physical and performance limitations on actuators, the system analyzes and processes the MIDI file to produce discrete haptic events which produce a pleasurable haptic experience to the user.

Figure 11A:
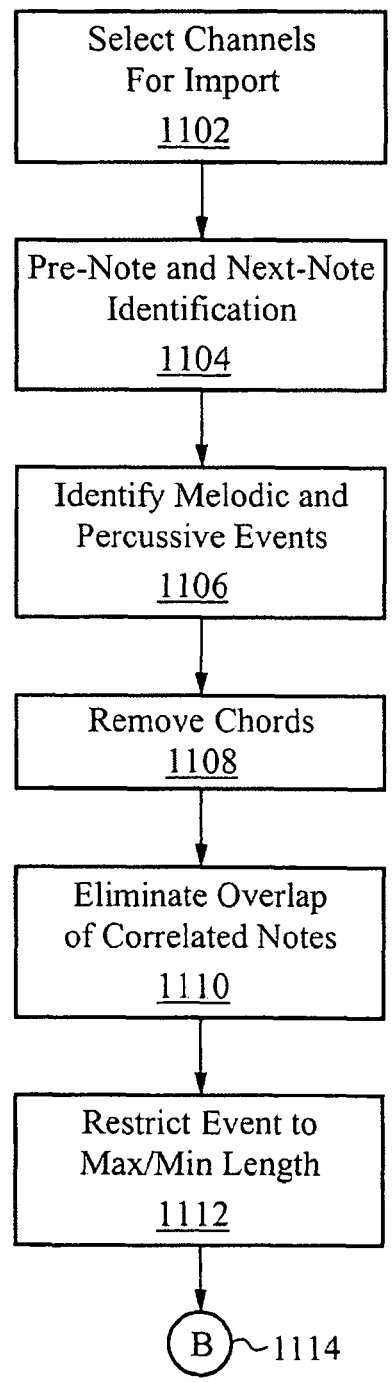
FIGS. 11A, 11B and 11C together constitute a process flow diagram illustrating a method for MIDI sequence processing to yield a corresponding sequence of haptic effects in accordance with an embodiment.
Figure 11B:
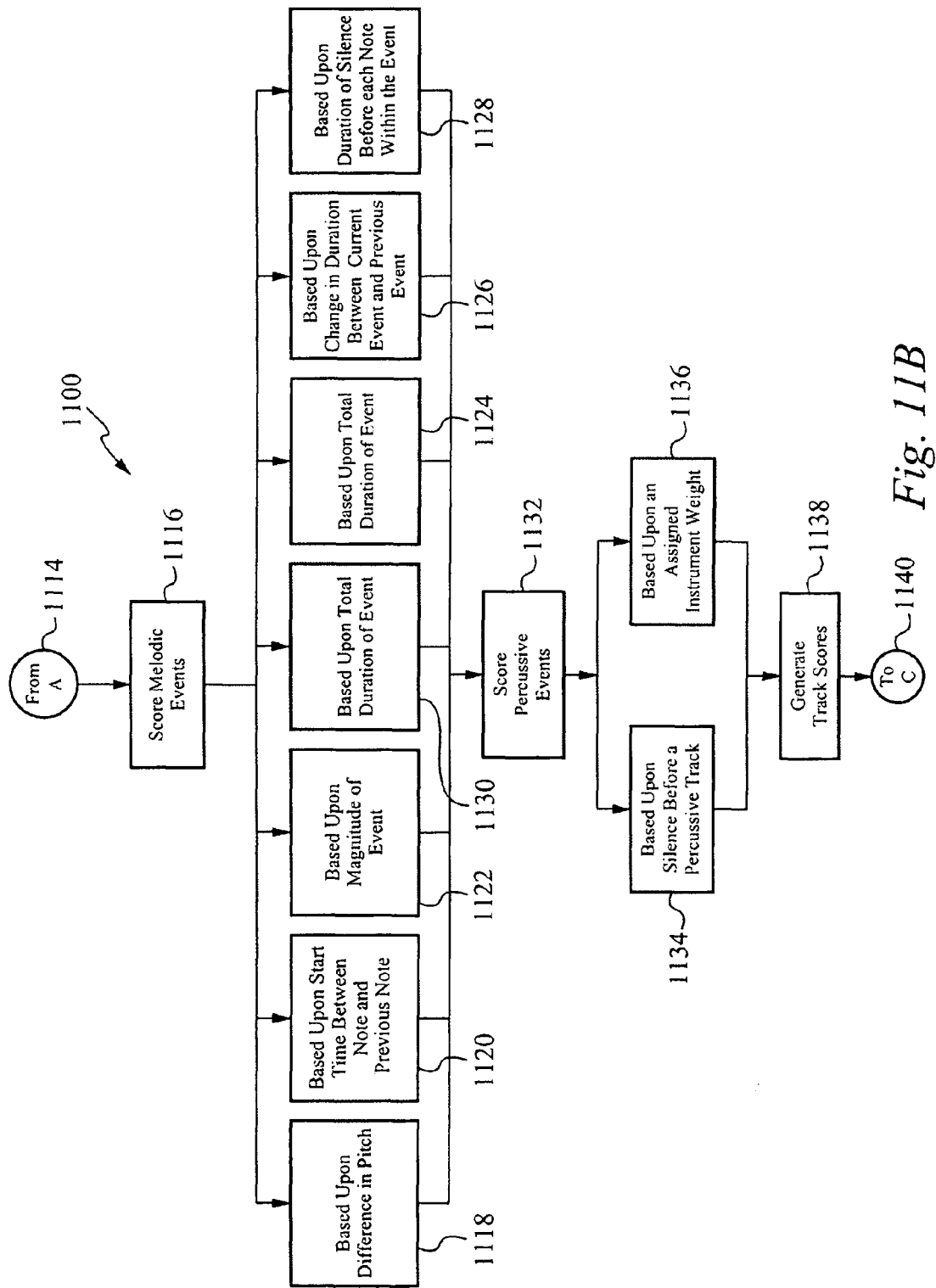
Figure 11C:
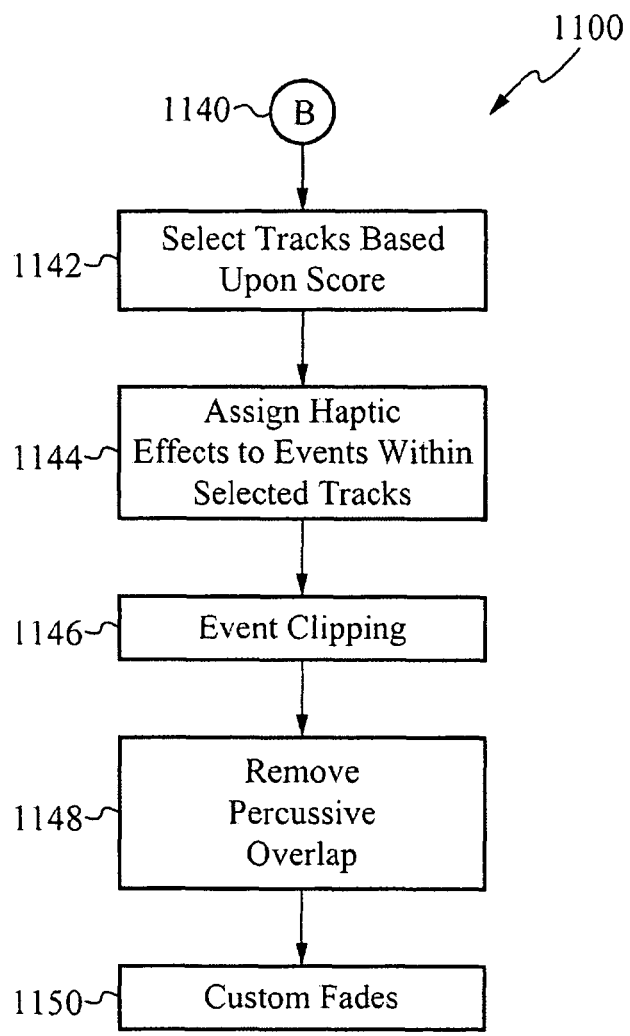

FIGS. 11A, 11B, and 11C together illustrate a process flow diagram used by the system to automatically process MIDI files and produce discrete haptic events in the end-player device. In general, the system analyzes the MIDI data and extracts a melody and/or percussion event sequence from the structured representation. The system then generates a score for each channel corresponding to each instrument, whereby the score of a non-percussive channel is related to the variability of notes in that channel. This has been found empirically to be effective at selecting the melody from a set of otherwise unknown input channels. For percussive instruments, the scoring strategy relies on a priori knowledge of the dominance of various percussive instruments. For example, the bass drum is most likely to be the dominant percussive channel, and so the notes associated with the bass drum in the percussive channel generally receives a higher score.

In addition to scoring the input channels from a MIDI sequence, the system and method performs one or more clipping operations on the events to allow discrete haptic events to be produced in the end-device. In an embodiment, the system clips one or more notes to a desired duration and processes the channels to remove overlapping notes, such as chords. In an embodiment, the system is configurable based on a number of parameters which may be manipulated to control the relative priority of one or more channels over other channels (e.g. percussion vs. melody).

As shown in FIG. 11A, selected ones, some, or all channels of the MIDI sequence are received in the system (1102). The sequence may be imported into the memory in the end device, a server in communication with the end device, and/or other intermediate component, computer or processor. In an embodiment, information from the imported MIDI file which is not actually used to produce the haptic events is actually deleted from memory. In an embodiment, information not actually used to produce the haptic events may be retained by the system to allow reconfiguration or fine tuning of the haptic events by a developer or the end user.

In an embodiment, the system executes various pre-processing procedures to the file after it is received. In an embodiment, the system executes pre-note identification and next-note identification techniques on the events by analyzing the timeline of the events (block 1104 in FIG. 11A). At block 1104, in one embodiment, each channel is processed to set up links from an event to the previous event in the same channel. Each channel is also processed to set up links from an event to the next event in the same channel. In an embodiment, the system analyzes the timeline of the entire structured audio representation file at one time. In another embodiment, the system analyzes portions of the timeline of the audio representation file at a time. This allows the system to quickly process large audio files having a long timeline (e.g. sound effects in a movie).

As shown in FIG. 11A, the system then identifies melodic and percussive events of interest, as shown at block 1106 by identifying the channels where melody and percussive events occur. Upon identifying the melodic and percussive events, the system is able to effectively utilize the identified events to score the melodic events (block 1116) and the percussive events (block 1132) in FIG. 11B.

As shown in FIG. 11, the system optionally processes each channel to remove chords, in an embodiment (1108). In an embodiment, the system identifies chords from the MIDI file as those events that start within a certain duration of each other on the same channel and are on non-percussive instrument channels. In an embodiment, this duration is set at 15 ms, although other time durations are contemplated. In an embodiment, once the system identifies chords in the MIDI event channels, the system retains only the events having the highest pitch and discards the other events which make up the chord from the timeline. In another embodiment, the system eliminates the highest pitch events and retains the lower or lowest pitch events. As will be discussed in more detail below, removal of chords from the timeline reduces the score given to a channel that has many chords, thereby aiding the system in identifying melodies in the timeline.

At 1110, the system identifies channel pairs that have identical or nearly identical notes at the same or substantially same time. This is often the case when two or more instruments are playing in harmony (e.g. two guitars simultaneously playing a same riff). For each channel, a time sampled vector of on-times is generated, wherein the on-times are the points where events occur. The system accomplishes this by examining each channel's events over the timeline and setting a value 1 for the time interval during which an event is occurring. Otherwise a value of 0 is set in the vector. This generates a set of vectors of length, n:

$$n = \text{floor}\left(\frac{T}{t_s}\right) \quad (2)$$

where T is the total duration of the MIDI input file and $t_s$ is the sampling interval.

To identify channels that have notes that overlap, a correlation is calculated for each of the channels:

$$\text{cor}(v_i, v_j) = \frac{\text{cov}(v_i, v_j)}{\sigma_i \sigma_j} = \frac{\langle v_i v_j \rangle - \langle v_i \rangle \langle v_j \rangle}{\sigma_i \sigma_j} \quad (3)$$

where $v_i$, $v_j$ are time sampled vectors, and $\sigma_i$ is the standard deviation of vector $v_i$ treated as a time series. If the correlation of two or more channels exceeds a correlation threshold value, then a portion or an entire channel may be eliminated from the timeline.

For example, referring back to FIG. 9, the channels 902 and 904 are shown between lines 900 and 908 to be substantially identical. Upon the system performing the above calculations on channels 902 and 904, the system will eliminate one of the two channels considering that they are playing the same melody at the same time. Which of the two channels which will be eliminated may be dependent on parameters set by the user and/or the system.

As shown in FIG. 11A, the system restricts the events to desired length by setting a maximum and minimum length by using a clipping process (1112). The system clips the events which are shorter than a specified minimum duration to be at least as long as the minimum duration. Additionally, events longer than a specified maximum duration are changed or clipped to be no longer than the maximum duration. In addition, two or more events that have a spacing duration between them to be less than a pre-specified minimum are changed to have at least the minimum spacing duration. This may be done by shortening one or both of the events in the sequence to produce the minimum spacing therebetween.

Turning now to FIG. 11B, once the system has completed importing and pre-processing each channel, the system initiates scoring of each channel in the received file (1116). It should be noted, in an embodiment, that the system is able to begin the scoring process as the importing/pre-processing of the received file is being executed. In an embodiment, the system begins the scoring process after the importing/pre-processing of the file is performed.

In an embodiment, the system scores the channels using two sets of rules. The first rule set is designed to give a higher score to the channels that have some variability as those channels are likely to be carrying the melody. The second rule set provides a ranking to percussive channels in terms of their traditional importance in defining the rhythm in the song.

Scoring is accomplished by examining all of the events in the timeline. Each event is passed through a scoring filter that assigns a score to the individual event. Once all events have been processed, a second loop through the timeline derives the score for all events in each channel, yielding a total score per channel. In an embodiment, this is done by simply accumulating the scores of the events. In another embodiment, this is done using an appropriate algorithm. As shown in FIG. 11B, the system scores the melodic and percussive events separately in an embodiment, although the scoring may be done simultaneously or one after another. In an embodiment, the system is capable of scoring the melodic and percussive events all together, whereby information determined for one type of event (i.e. melodic or percussive) may be used to analyze or evaluate the other type of event (i.e. percussive or melodic).

For melodic events in the timeline, the system utilizes a subset of rules in scoring the events, as shown at 1116 in FIG. 11B. In an embodiment, each of the subset rules are executed by the system simultaneously. In an embodiment, one or more of the subset rules are executed by the system in a sequence.

As shown in FIG. 11B, the system scores the pitch change between events in accordance with block 1118 of an embodiment. As in block 1118, the system calculates the absolute value of the difference between the pitch of the current event and the pitch of one or more previous events, whereby the pitches each have a determined value. The system is able to assign a value to the pitch from the channel data inherently encoded in the audio representation file. In an embodiment, the difference is output as the pitch score. In an embodiment, the difference value is scaled by a predetermined factor (e.g. 500) to get the pitch score.

As shown in FIG. 11B, the system scores the start time between events in accordance with block 1120 of an embodiment. The system in block 1120 analyzes the duration of the events to determine whether a rhythm is being played in the channel. In an embodiment, in block 1120 the difference in start times is calculated between an event and the immediately preceding event. In an embodiment, in block 1120 the difference in start times is calculated between a preceding event and an event previous to the preceding event. In an embodiment, the system weights the differences before outputting a start time score. In an embodiment, the weighted amount is of a factor of 5. It is contemplated, however, that the weighted value can be a factor other than 5. Depending on other rhythms in the file or the genre of the song, the system may score the durations higher or lower such that the system outputs appropriately resolved haptic events.

As shown in FIG. 11B, the system scores the magnitude or intensity of the event in accordance with block 1122 of an embodiment. Block 1122 designates a score equal based upon a function of the magnitude of the event. The system is able to determine the magnitude of each event from the channel data inherently encoded in the structured representation file.

As shown in FIG. 11B, the system scores the duration of an event in accordance with block 1124 in an embodiment. Block 1124 designates a score based upon a function of the duration of the event. In an embodiment, the system assigns a higher score for events which have a longer duration than events which have a shorter duration. In another embodiment, the system assigns a lower score for events which have a longer duration than events which have a shorter duration As shown in FIG. 11B, the system scores the change in duration of an event in accordance with block 1126 of an embodiment. In particular, the system designates a score based upon a change in duration between the current event and a previous event in block 1126.

As shown in FIG. 11B, the system scores the change in duration of an event in accordance with block 1128 of an embodiment. In particular, the system designates a score based upon a duration of silence before each note within the event in block 1128. For example, if the system identifies an event that occurs after a long duration of silence in a particular channel, the system may assign a high score to the event such that it will most likely be output as a haptic event. An example of this would be a cymbal crashing at the end of a drum roll.

In an embodiment, as illustrated by block 1130, melodic events are optionally scored by the system in relation to their entropy. In the process of evaluating the rules, the system may utilize a relationship between the scores assigned to a channel and the acoustic entropy associated with that channel. To estimate the entropy of each melodic channel, a distribution of notes is constructed by the system. The traditional 12 tone scale is used to define equivalence classes $\{p(k), k=1 \ldots 12\}$ of note pitches. Each event is classified according to which tone in the 12 tone scale is associated with the event's key. A distribution is built by scaling each event contribution using a perceptual accent rule, whereby weighting, w, is determined by equation 3:

$$w = \left(1 - e^{\frac{d}{\tau}}\right)^{\alpha} \quad (4)$$

where variable d is the duration (in seconds) of the silence between the current event and the previous event τ is the saturation rest length (taken to be 0.5 s) and α is the minimum discriminable duration (taken to be 2 s). It should be noted that other values for saturation rest length and minimum discriminable duration are contemplated and are not limited to the values mentioned herein.

The entropy of this distribution is calculated using the formula in equation 4:

$$e = -\sum_{k=1}^{12} p(k) \log(p(k)) \quad (5)$$

where p(k) are the classes of tonal pitches from 1 to 12 (for a 12 tone scale).

In addition to scoring the melodic events, the system scores percussive events as shown by block 1132 in FIG. 11B. In an embodiment, the system utilizes two rules in scoring the percussive events. In particular, the system scores the duration of the silence before each percussive note. The duration of silence is considered to be milliseconds, and the score is weighted in an embodiment. In an embodiment, the scored silence value is divided by a value of 4, although other values are contemplated.

As shown in FIG. 11B, the system assigns a value to each percussive instrument depending on the type of percussion instrument. In an embodiment, a weight value of 1 to 5 is assigned by the system for each percussion instrument such that the more dominant instruments receive a higher value. For example, events attributed to a bass drum instrument are given a value of 5 whereas events attributed at a high-hat symbol is given a value of 1. In an embodiment, the value is weighted by a factor (e.g. 100) in producing the per event score. The total event score for the percussive events is based upon a subset of these rules.

In an embodiment, the scoring multipliers for both percussive and melodic rules are weighted by the system to emphasize melody instruments over percussive ones when absolute rankings of channels are generated. This processing occurs at Block 1138 where channel scores are generated. The weightings may be based on the genre of music, type of audio file (e.g. music vs. sound effects of video), user preference, type of end device, etc.

Turning now to FIG. 11C, following the generation of scores per channel (block 1138), the system is able to sort the channels based on score values, as shown by block 1142. In an embodiment, the system sorts the melodic channels and percussive channels separately, although the system is capable of sorting both types of channels together. In an embodiment, the scored channels are sorted in descending order, whereby the channels with the highest scores are ranked as "high". In an embodiment, the scored channels are sorted in ascending order. In an embodiment, the system sorts channels which are within a desired range of scores or only chooses channels with desired scores. In an embodiment, the system ranks the scores highest to lowest in which the highest-ranked events will be output as a haptic event and the lowest-ranked events will not be output as a haptic event.

Upon the system ranking or choosing the channels based on score, the system is able to determine which channels will provide the events upon which the haptic effects will be based. In an embodiment, the system generates haptic effects at Block 1144 using the following pseudo-code:

While channels remain
  For each empty duration >400 ms in the Vibe channel
    Fill the empty duration, with a 100 ms cushion at the beginning and end of the gap with the highest scoring channel in that interval.
end In other words, the system automatically maps the highest ranked haptic events from the beginning to the end of the song. Thereafter, the system "fills in the blanks" and again maps the next highest ranked haptic events which are able to be placed within the empty or non-haptic event portions of the song. This process is repeated until the maximum number of allowed haptic events are mapped in the song, taking into consideration of actuator resolution, duration cushions, user preference, haptic effect styles and type of song. It should be noted that the above is only an example pseudo code and the system may utilize different duration cushions as well as utilize the lowest scoring channel or other criteria.

As the events are assigned to be a haptic event, the system clips the haptic event to have a duration within a desired range. In an embodiment, the clipping range is between 200 ms and 300 ms, although greater or lesser durations are contemplated and may depend on the properties of the haptic actuator. In addition, the start time of the event can be offset by a desired amount to ensure perceptual coupling between audio and haptic events on different types of actuators. In an embodiment, the intensity of the haptic event may be adjusted in the system. For example, the minimum duration may be set to a lower value and the cushioning time may be increased.

As shown in FIG. 11C, the system removes percussive overlap in an embodiment. The system optionally independently constructs a melodic and percussive channel using the 'fill in the blanks' algorithm, and then merges together them to produce the final mapped haptic events. This is likely to be most effective when only "strong" effects are being used, as overlapping sharp effects can yield unpredictable vibe behavior. Alternatively it is possible for the system to attenuate the magnitude of haptic events that have overlapping percussive events, whereby the attenuated haptic events are then output at maximum magnitude. This provides the end device with the characteristic of preserving the melody yet displaying perceptual accentuation for the rhythm.

In an embodiment, the system is able to add Custom Fades (Block 1150) at certain points in the timeline of the structured representation signal. A designer may choose to replace a note of long duration with a shorter effect that fades out (e.g. 500 ms). Also, the end of a phrase or melodic line can be made more interesting by adding a similar fade effect.

In an embodiment, the system looks for events with a long (more than about 500 milliseconds) duration as they are added to the timeline in accordance with the above rules. If there is also a large time gap (about 1000 milliseconds) between the particular event and the next event, the system may automatically fade in or out the particular event. To implement this approach, the system identifies and builds a list of such haptic events which have a haptic effect characteristic or profile that fades in and/or out. After the entire timeline has been constructed, the system replaces the existing haptic events with the faded haptic events from the list. The Fade effect may be implemented as a periodic or magnitude dependent effect that decays for its entire duration.

The methods for converting digital sampled audio and/or structured representation files described above allow for the automatic conversion of notes to haptic events. Once converted, these haptic event sequences are able to be stored and be re-distributed to other end-devices by an appropriate manner. For example, the haptic events sequences may be stored as an output file in a server that is in communication with one or more clients over a network. Upon establishing a communication link with the client, the server may deliver the output file electronically to be played in the client. Likewise, the haptic sequences can be used in a variety of settings known in the art. For example, to notify a user of a phone call or an event such as an appointment, ring tone, alarm, incoming message such as a weather report or text message and the like. In an embodiment, the structured representation files may be applied to a karaoke song in which the end device (e.g. karaoke microphone) outputs haptic effects after automatic conversion of the file to cue the singer of the vocals. In an embodiment, the end device is able to automatically convert, map and output haptic event sequences for sound effects or other audio in a video, video game, music video or movie file which is downloadable onto the end device.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

We claim:

1. A method comprising:
   receiving a representationally structured file comprising a plurality of audio channels that each comprise a plurality of audio events in a timeline;
   assigning, based on a first loop of the timeline, an event score for each of select audio events within the plurality of audio events in the plurality of audio channels;
   deriving, based on a second loop of the timeline, a total score for each of the plurality of audio channels based on respective event scores of the select audio events in the plurality of audio channels;
   designating at least one audio channel from the plurality of audio channels based on the total score for each of the plurality of audio channels;
   assigning a haptic event to each of the select audio events of the at least one audio channel based on the respective event scores of the select audio events of the at least one audio channel;
   outputting an output file that includes the haptic event along with accompanying audio data and is indicative of haptic parameters of the haptic event; and
   based on the output file, providing a playback of the haptic event to an actuator and in synchrony with a playback of a corresponding audio event.

2. The method of claim 1, wherein adjacent haptic events are temporally spaced apart by a minimum time duration.

3. The method of claim 1, wherein the plurality of audio events in the representationally structured file are notes in a musical piece.

4. The method of claim 3, further comprising:
   determining whether a particular one of the plurality of audio events begins within a threshold time of an adjacent one of the plurality of audio events in a same one of the plurality of audio channels; and
   choosing, as one of the select audio events, which of the particular one and the adjacent one has a higher pitch when the particular one and the adjacent one are within the threshold time.

5. The method of claim 1, wherein the event score is assigned based on a difference between a pitch of a current one of the plurality of audio events and a pitch of a previous one of the plurality audio events.

6. The method of claim 1, wherein the event score is assigned based on a difference in start times between a current one of the plurality of audio events and a previous one of the plurality audio events.

7. The method of claim 1, wherein the event score is assigned based upon a magnitude value of at least one of the plurality of audio events.

8. The method of claim 1, wherein the event score is assigned based upon a duration of at least one of the plurality of audio events.

9. The method of claim 1, wherein the event score is assigned based upon a change in duration between a particular one of the plurality of audio events and an adjacent one of the plurality of audio events.

10. The method of claim 9, wherein the adjacent one of the plurality of audio events is previous to the particular one of the plurality of audio events in the timeline.

11. The method of claim 1, further comprising adjusting a duration of the haptic event to be greater than a minimum time duration and less than a maximum time duration.

12. The method of claim 1, wherein the event score is weighted based on an instrument playing one of the plurality of audio events in one of the plurality of audio channels.

13. The method of claim 1, wherein the event score for each of the plurality of events within a non-percussive one of the plurality of audio channels is assigned based upon a difference between a pitch of a current one of the plurality of audio events and a pitch of a previous one of the plurality of audio events.

14. A non-transitory computer-readable medium having instructions stored thereon that, when executed by a processor, cause the processor to implement a method comprising:
   receiving a representationally structured file comprising a plurality of audio channels that each comprise a plurality of audio events in a timeline;
   assigning, based on a first loop of the timeline, an event score for each of select audio events within the plurality of audio events in the plurality of audio channels;

deriving, based on a second loop of the timeline, a total score for each of the plurality of audio channels based on respective event scores of the select audio events in the plurality of audio channels;

designating at least one audio channel from the plurality of audio channels based on the total score for each of the plurality of audio channels;

assigning a haptic event to each of the select audio events of the at least one audio channel based on the respective event scores of the select audio events of the at least one audio channel;

outputting an output file that includes the haptic event along with accompanying audio data and is indicative of haptic parameters of the haptic event; and based on the output file, providing a playback of the haptic event to an actuator and in synchrony with a playback of a corresponding audio event.

15. The computer-readable medium of claim 14, wherein adjacent haptic events are temporally spaced apart by a minimum time duration.

16. The computer-readable medium of claim 14, wherein the plurality of audio events in the representationally structured file are notes in a musical piece.

17. An apparatus comprising:
a processor; and
a memory coupled to the processor and comprising modules that, when executed by the processor:
receive a representationally structured file comprising a plurality of audio channels that each comprise a plurality of audio events in a timeline;
assign, based on a first loop of the timeline, an event score for each of select audio events within the plurality of audio events in the plurality of audio channels;
derive, based on a second loop of the timeline, a total score for each of the plurality of audio channels based on respective event scores of the select audio events in the plurality of audio channels;
designate at least one audio channel from the plurality of audio channels based on the total score for each of the plurality of audio channels;
assign a haptic event to each of the select audio events of the at least one audio channel based on the respective event scores of the select audio events of the at least one audio channel;
output an output file that includes the haptic event along with accompanying audio data and is indicative of haptic parameters of the haptic event; and
based on the output file, provide a playback of the haptic event to an actuator and in synchrony with a playback of a corresponding audio event.

18. The apparatus of claim 17, wherein adjacent haptic events are temporally spaced apart by a minimum time duration.

19. The apparatus of claim 17, wherein the plurality of audio events in the representationally structured file are notes in a musical piece.

20. The apparatus of claim 19, wherein the modules, when executed by the processor, further perform:
determining whether a particular one of the plurality of audio events begins within a threshold time of an adjacent one of the plurality of audio events in a same one of the plurality of audio channels; and
choosing, as one of the select audio events, which of the particular one and the adjacent one has a higher pitch when the particular one and the adjacent one are within the threshold time.

\* \* \* \* \*